J. OTTI.
REVERSIBLE CLUTCH.
APPLICATION FILED APR. 14, 1920.

1,393,693. Patented Oct. 11, 1921.

Inventor
J. Otti.

By Geo. P. Kimmel.
Attorney

UNITED STATES PATENT OFFICE.

JOSEPH OTTI, OF OKLAHOMA, OKLAHOMA.

REVERSIBLE CLUTCH.

1,393,693.  Specification of Letters Patent.  Patented Oct. 11, 1921.

Application filed April 14, 1920. Serial No. 373,939.

*To all whom it may concern:*

Be it known that I, JOSEPH OTTI, a citizen of the United States, residing at Oklahoma city, in the county of Oklahoma and State of Oklahoma, have invented certain new and useful Improvements in a Reversible Clutch, of which the following is a specification.

This invention relates to power transmitting mechanism, and has for one of its objects to provide a simply constructed device whereby motion may be transmitted from one shaft to another in the same direction no matter in which direction the initial shaft may be rotated.

With these and other objects in view the invention consists in certain novel features of construction as hereafter shown and described and then specifically pointed out in the claims, and in the drawings illustrative of the preferred embodiment of the invention—

Figure 1:
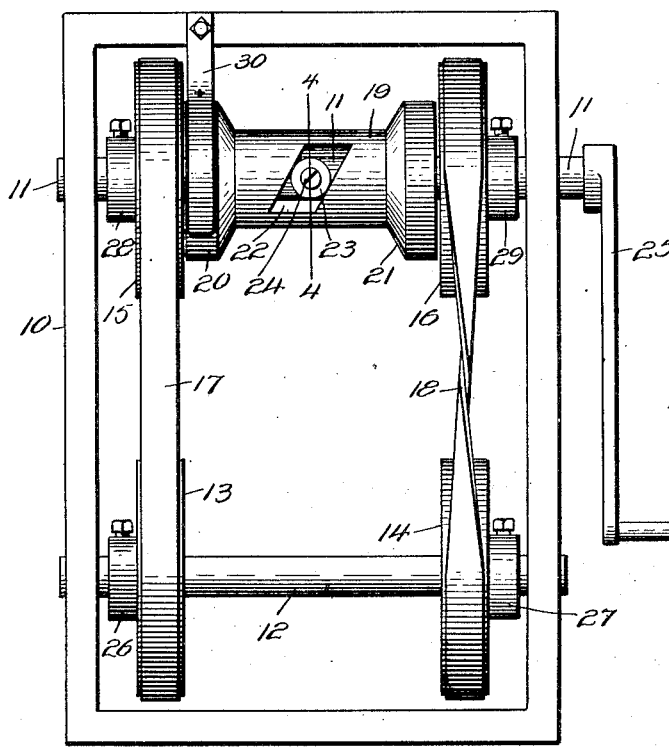
Figure 1 is a plan view of the improved device.
Figure 2:
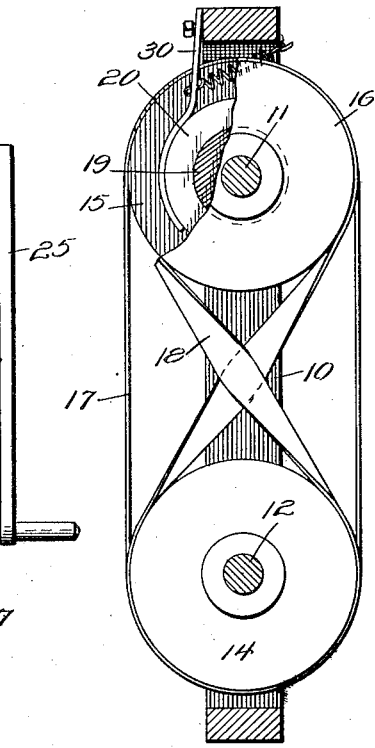
Fig. 2 is a side elevation, partly in section.

The improved device may be employed in connection with various forms of machinery, and it is not desired to limit the invention in any manner in this respect, but for the purpose of illustration the device is shown mounted in a conventional frame 10, and in its simpler form comprises two shafts 11 and 12 mounted for rotation in the frame 10 and in spaced relation.

Fast upon the shaft 12 are belt pulleys 13 and 14, and loose upon the shaft 11 are similar belt pulleys 15 and 16. A drive belt 17 operates over the pulleys 13 and 15, and a drive belt 18 operates over pulleys 14 and 16, the latter belt being twisted, as shown, so that the motion of the pulley 16 will be transmitted to the pulley 14 reversely to the motion transmitted from the pulley 15 to the pulley 13.

Loosely mounted upon the shaft 11 between the pulleys 15 and 16 and movable longitudinally of the shaft is a drum or sleeve 19 having enlarged ends 20 and 21 adapted to be engaged with the confronting faces of the pulleys.

Formed through one wall of the sleeve 19 is an obliquely directed slot 22 and fitting in the slot is a bearing roller 23, the roller being pivotally united to the shaft 11 by a cap screw 24.

Means are provided for rotating the shaft 11, for instance by a crank 25.

Stop collars 28 and 29 are arranged upon the shaft 11 to support the pulleys 15 and 16, and stop collars 26 and 27 may be formed upon the pulleys 13 and 14 to secure the pulleys 13 and 14 to the shaft by set screws or the like, so that the pulleys 13 and 14 rotate with the shaft 12.

A spring pressed brake element 30 is associated with one of the enlargements of the sleeve, for instance the enlargement 20, to retard the rotary movement of the sleeve 19 and permit the shaft 11 to rotate freely therein, to give the roller bearing 23 every advantage to slide the sleeve longitudinally of the shaft and make the proper grip contact and prevent the sleeve 19 from slipping on the pulleys 15 and 16.

With a device thus constructed if rotary motion be imparted to the shaft 11 by turning the crank 25 in one direction, for instance to the right, the roller 23 revolving with the shaft, will engage one of the oblique walls of the slot 22 and forcibly move the sleeve 19 longitudinally on the shaft 11 and pick up the sleeve and cause it to rotate with the shaft and at the same time compress the outer face of the enlargement 20 against pulley 15 and thus form a friction clutch to couple the pulley to the shaft and cause the belt 17 to rotate the shaft in the same direction as the motive power, for instance the crank 25. The pulley 16 at the same time runs idle on the shaft 11.

If the motion of the shaft 11 be reversed by rotating the crank 25 to the left, the roller 23 will engage the other oblique wall of the slot and press the enlargement 21 against the pulley 16 and rotate the same in the opposite direction, but owing to the twisted belt 18, this motion will be transmitted to the shaft 12 in the same direction or to the right.

Figure 3:
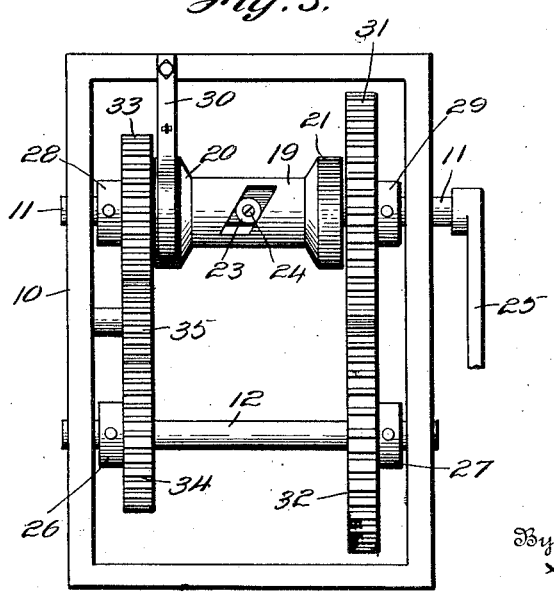
Fig. 3 is a view similar to Fig. 1 illustrating a modification in the construction.
Figure 4:
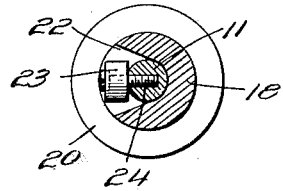
Fig. 4 is a transverse section on the line 4—4 of Fig. 1.

In Fig. 3 the improved device is shown with the belts 17 and 18 replaced by gears 31—32 in place of the twist belt 18, and gears 33 and 34 on the shafts 11 and 12 and an idler pinion 35 between them, in place of the straight belt 17, but the results are the same, as will be obvious.

The improved device will be found useful and convenient in connection with many forms of machinery, and can be modified as to size and capacity as required.

The preferred embodiment of the invention is disclosed in the drawings and set forth in the specifications, but it will be understood that any modifications within the scope of the claims may be made in the construction without departing from the principle of the invention or sacrificing any of its advantages.

I claim:

1. In an apparatus of the class described, a driving shaft and a driven shaft, rotating means attached to said driven shaft in spaced relation, means adapted to communicate motion from said driving shaft in one direction to one of said driven shaft rotating means and having a clutch element, means adapted to communicate motion from said driving shaft in the opposite direction to the other of said driven shaft rotating means and having a clutch element, a sleeve slidable and rotative upon said driving shaft and having opposing clutch elements adapted to be alternately engaged with the clutch elements of said driven shaft rotating means, said sleeve having a slot directed obliquely to the longitudinal axis of the sleeve, and a roller carried by said driving shaft and operating in said slot, whereby motion will be transmitted in the same direction to the driven shaft regardless of the direction of motion of the driving shaft.

2. In an apparatus of the class described, a driving shaft and a driven shaft, rotating means attached to said driven shaft in spaced relation, means adapted to communicate motion from said driving shaft in one direction to one of said driven shaft rotating means and having a clutch element, means adapted to communicate motion from said driving shaft in the opposite direction to the other of said driven shaft rotating means and having a clutch element, a sleeve slidable and rotative upon said driving shaft and having opposing clutch elements adapted to be alternately engaged with the clutch elements of said driven shaft rotating means, and means operative by said driving shaft for moving said sleeve in one direction longitudinally of the driving shaft when the same is rotated in one direction to couple one of said clutch elements and operative to move the sleeve in the opposite direction to couple the other clutch elements when the motion of the driving shaft is reversed.

In testimony whereof, I affix my signature hereto.

JOSEPH OTTI.